Patented Sept. 21, 1954

2,689,841

UNITED STATES PATENT OFFICE 2,689,841

RUBBER COMPOSITIONS AND VULCANIZED RUBBER PRODUCTS MADE THEREFROM

Jean Augustin, Paris, France, assignor to Societe Anonyme des Terres Decolorantes Françaises Franterre, Paris, France No Drawing. Application April 3, 1951, Serial No. 219,120

Claims priority, application France February 12, 1946

20 Claims. (Cl. 260—41.5)

This invention relates to the vulcanization of rubber and similar elastomers, and more particularly to the use of cryptocrystalline clays as fillers or reinforcing agents in rubber and similar vulcanizable materials.

It is an object of my invention to provide rubber mixes containing a cryptocrystalline clay as a filler or reinforcing agent which are capable of being vulcanized to produce products comparing favorably in respect of their elasticity, strength, hardness and wear-resisting properties to those obtainable with the use of carbon blacks and which have the advantage, as compared with carbon blacks, that they make it possible to impart to the rubber product any desired color by appropriate addition of coloring pigments or dyes.

It is known in the rubber industry to use fillers or reinforcing agents such as carbon black, petroleum black, china clay or kaolin, and magnesium carbonate. Blacks, however, have the drawback of reducing the resiliency of the rubber and of coloring the finished product. Both china clay and magnesium carbonate have the advantage of imparting little or no color but impart inferior mechanical characteristics to the vulcanized rubber products made from rubber mixes containing them.

As disclosed in my copending U. S. patent application Ser. No. 725,728, filed January 31, 1947, of which the present application is a continuation-in-part, I have found that when certain clays characterized by an extremely fine particle size are substituted for such fillers as the so-called colloidal china clays and the magnesium carbonates of the prior art, the vulcanized rubber products made from such mixes show markedly improved strength and other desired physical properties as compared to vulcanized rubbers made with the use of such prior art materials and compare favorably as regards their strength, elasticity and hardness properties with vulcanized rubbers made with the use of carbon blacks.

The clays disclosed in my aforesaid application were of the halloysitic type and are known to be cryptocrystalline, or microcrystalline, in character. When studied under the electron microscope they are found to have a distinctly crystalline structure with average particle sizes far below those of the so-called "colloidal clays" previously used in vulcanizable rubber mixes. In fact, the particle sizes of halloysitic clays are of the same order as those of the carbon blacks more generally used in rubber manufacture.

Another characteristic of the halloysitic clays that sets them off from the previously used china clays and which appears to contribute to their greater utility when substituted for such clays in rubber mixes is the homogeneity of the sizes of their particles. For example, I have found that the halloysitic clays obtained from the Provins basin in France show an average size of less than about 150 millimicrons and contain a large proportion of microcrystalline particles within the range of 20–100 millimicrons. Speaking generally, halloysitic clays have an average particle size of less than 200 millimicrons, and usually no substantial proportion of particles having a diameter greater than 500 millimicrons.

I found on further investigations that the ability to impart satisfactory strength properties to rubber mixes, comparable to and in some cases exceeding those obtainable with the use of carbon blacks, was not confined to the halloysitic clays, but was shared by other clays having a cryptocrystalline or microcrystalline character and an average particle size of similar order as possessed by the halloysitic clays. The allophanes and attapulgites fall in this category. In addition, I have studied the microkaolinites and find that when they are selected from deposits which in their naturally occurring state or after a suitable refining treatment have a mean particle diameter of less than about 200 millimicrons, they may be expected when used as fillers in rubber mixes to impart strength and other physical properties to the vulcanized rubber products produced therefrom that compare in a general way favorably with those obtained with the halloysites and in all cases are far superior to the colloidal clays that have heretofore been used or proposed to be used as reinforcing agents in rubber.

Speaking generally, the clays that are preferred in practising my invention belong to the class of hydrous aluminum silicates, although all clays that are microcrystalline and possess the requisite fineness may be employed. In general, to be suitable for my purposes, the clays should not include any substantial proportion of particles having a diameter equal to or greater than 500 millimicrons, and, as above stated, the average particle size should not exceed 200 millimicrons. It also appears that the greater the homogeneity as to particle size the better the desired results, other things being equal.

As compared with carbon blacks and the like the use as a filler in rubber mixes of cryptocrystalline clays in which the average particle diameter is less than 200 millimicrons has the advantage of retaining the natural resiliency of the rubber, and what is of equal if not greater importance, it is made possible to obtain rubber compositions capable of being colored in the mass by suitable pigments or dyes.

Moreover, experiments conducted by me have shown that cryptocrystalline clays having the fineness above specified may be used as fillers in a wide range of proportions with respect to the other components of a rubber mix, such range being of about the same order of magnitude as those of the conventional carbon blacks and other materials previously used for rubber fillers.

The experiments just mentioned were of two kinds. In a first series of tests, amounts of 0, 25, 50, 75, 100 and 125 parts by weight of halloysitic clay from the Provins district in France, and 40 and 70 parts of type M. P. C. black, for 100 parts by weight of rubber, were incorporated in a blend containing natural rubber. The mixes were vulcanized at 143° C. for 15 minutes, and the resulting samples were subjected to tensile, elongation and Shore hardness tests.

The results of the tests are set forth in the following table in which proportions are given in parts by weight:

RUBBER MIX COMPOSITIONS

| Smoked sheet | 100 | 100 | 100 | 100 | 100 | 100 | 100 | 100 |
|---|---|---|---|---|---|---|---|---|
| Zinc Oxide | 5 | 5 | 5 | 5 | 5 | 5 | 5 | 5 |
| Stearic Acid | 2 | 2 | 2 | 2 | 2 | 2 | 2 | 2 |
| Sulfur | 3 | 3 | 3 | 3 | 3 | 3 | 3 | 3 |
| Accelerators | 1.2 | 1.625 | 2.05 | 2,475 | 2.9 | 3.325 | 1.2 | 1.5 |
| Provins Halloysitic Clay | 0 | 25 | 50 | 75 | 100 | 125 | | |
| Type M. P. C. Black | | | | | | | 40 | 70 |

VULCANIZING TEST RESULTS

| Shore Hardness | 46 | 55 | 60 | 71 | 76 | 80 | 62 | 77 |
|---|---|---|---|---|---|---|---|---|
| Tensile Breaking Strength, kg. per sq. cm | 320 | 360 | 320 | 270 | 255 | 240 | 312 | 267 |
| Elongation, percent | 650 | 640 | 580 | 520 | 485 | 450 | 640 | 445 |

The above table clearly shows that halloysitic clay imparts to rubber blends mechanical characteristics at least equivalent and in some respects superior to those conferred by corresponding proportions of carbon black, while being greatly superior thereto as regards the color of the resulting rubber product.

The tensile breaking strength is higher with halloysitic clay in average proportions (25 to 50%) than it is with black (40%), and it is not lower when a higher proportion (70%) is used.

In a second set of tests, proportions of from 60 to 120 parts by weight of halloysitic clay from the Provins district in France, 40 to 70% by weight of H. M. P. black and 60 to 120% parts by weight of china clay for 100 parts of rubber were incorporated into a blend containing G. R. S. synthetic rubber (a co-polymerization product of about 75 parts butadiene with 25 parts styrolene). The mixes were vulcanized at 143° C., and the optimum vulcanization was varied from 20 to 60 minutes.

The test results are given in the following tabulation:

RUBBER MIX COMPOSITIONS

| G. R. S. Rubber | 100 | 100 | 100 | 100 | 100 | 100 |
|---|---|---|---|---|---|---|
| Stearic Acid | 2 | 2 | 2 | 2 | 2 | 2 |
| Zinc Oxide | 5 | 5 | 5 | 5 | 5 | 5 |
| Sulfur | 3.2 | 3.2 | 3.2 | 3.2 | 3.2 | 3.2 |
| Plasticizers (Mineral oils) | 5 | 5 | 5 | 5 | 5 | 5 |
| Phenyl-beta-naphthylamine | 1 | 1 | 1 | 1 | 1 | 1 |
| Accelerators | 1.95 | 2.95 | 1.5 | 1.5 | 1.5 | 1.5 |
| Provins Halloysitic Clay | 60 | 120 | | | | |
| H. M. F. Black | | | 40 | 70 | | |
| China Clay | | | | | 60 | 120 |

VULCANIZING TEST RESULTS

| Opt. Vulc'n Time (min.) | 20 | 30 | 40 | 60 | 50 | 60 |
|---|---|---|---|---|---|---|
| Shore Hardness | 60 | 68 | 65 | 72 | 52 | 70 |
| Tensile Breaking Strength (kg. per sq. cm.) | 190 | 180 | 180 | 200 | 70 | 90 |
| Elongation, Percent | 700 | 425 | 550 | 400 | 550 | 350 |

The above table clearly demonstrates that the tensile breaking strength with 60% and 120% halloysitic clay as a filler is much higher than with 60% and 120% china clay, whereas the tensile strength with 40% and 70% black as a filler is substantially the same as with halloysitic clay. The elongations are higher with halloysitic clay than with china clay.

Thus, it will be seen that halloysitic clay imparts to rubber mixes mechanical characteristics greatly superior to those conferred to them by china clay, and this remains true regardless of the proportions used. Moreover, as compared to carbon blacks, the mechanical properties imparted are at least equivalent, while at the same time halloysitic clay has the advantage over blacks in that it does not color the rubber so that, as already stated, any desired color can be imparted to the rubber product.

In a series of tests carried on with the use of microkaolinites having an average particle size below 200 millimicrons in a mix of natural rubber, the following results were obtained in comparison with an otherwise similar mix containing dibutylamine alone with no microkaolinite and a mix containing only M. P. C. carbon black. The respective compositions are also set forth in the tabulation, proportions given in parts by weight:

RUBBER MIX COMPOSITIONS

| Smoked Rubber Sheets | 100 | 100 | 100 | 100 | 100 |
|---|---|---|---|---|---|
| Zinc Oxide | 5 | 5 | 5 | 5 | 5 |
| Stearic acid | 2 | 2 | 2 | 2 | 2 |
| Sulfur | 3 | 3 | 3 | 3 | 3 |
| Benzothiazyl disulfide | 0.8 | 0.8 | 0.8 | 0.8 | 0.8 |
| Diphenylguanidine | 0.4 | 0.4 | 0.4 | 0.4 | 0.4 |
| Microkaolinite | | 25 | 75 | 125 | |
| Dibutylamine | | 0.425 | 1.275 | 2.125 | |
| MPC Black | | | | | 40 |

VULCANIZING TEST RESULTS

| Optimum Vulcanization time (minutes) | 10 | 5 | 5 | 5 | 15 |
|---|---|---|---|---|---|
| Shore hardness | 39 | 53 | 65 | 80 | 62 |
| Tensile breaking strength kg./cm.² | 241 | 338 | 285 | 255 | 310 |
| Elongation, Percent | 740 | 605 | 575 | 470 | 525 |

It will be seen from the above that the results of the tests using microkaolinite compare favorably with those obtained using halloystitic clay in a natural rubber mix, and that the results indicate that the combination of microkaolinite and dibutylamine has equivalent reinforcing properties to those of a carbon black.

Still another series of tests were conducted using the same microkaolinite in a mix of synthetic rubber (G. R. S. Standard) in comparison with carbon black, on the one hand, and colloidal kaolin on the other. Here again the respective compositions are set forth in the tabulation, proportions being given in parts by weight:

RUBBER MIX COMPOSITIONS

| | | | | |
|---|---|---|---|---|
| G. R. S. Standard | 100 | 100 | 100 | 100 |
| Stearic acid | 2 | 2 | 2 | 2 |
| Zinc Oxide | 5 | 5 | 5 | 5 |
| Sulfur | 3.2 | 3.2 | 3.2 | 3.2 |
| Anthracene oil | 5 | 5 | 5 | 5 |
| Phenyl-beta-naphthylamine | 1 | 1 | 1 | 1 |
| Benzothiazyl disulfide | 0.75 | 0.75 | 1 | 1 |
| Diphenylguanidine | 0.2 | 0.2 | 0.5 | 0.5 |
| Microkaolinite | 60 | 120 | | |
| Dibutylamine | 1 | 2 | | |
| H. M. F. Black | | | 40 | |
| Colloidal Kaolin | | | | 60 |

VULCANIZING TEST RESULTS

| | | | | |
|---|---|---|---|---|
| Optimum Vulcanization time (minutes) | 20 | 10 | 20 | 50 |
| Shore Hardness | 61 | 72 | 56 | 52 |
| Tensile (breaking) strength kg./cm² | 172 | 198 | 192 | 83 |
| Elongation, percent | 775 | 670 | 650 | 900 |

In each of the above series of tests wherein microkaolinite was used as a reinforcing filler, the mixes were vulcanized at 143° C.

The results of still another series of tests are set forth in the following table in which again proportions are given in parts by weight:

RUBBER MIX COMPOSITIONS

| | | | | | |
|---|---|---|---|---|---|
| Ordinary raw sheet rubber | 100 | 100 | 100 | 100 | 100 |
| Accelerators | 1.1 | 2.2 | 1 | 1 | 1 |
| Sulfur | 2.85 | 2.5 | 2.5 | 2.5 | 2.5 |
| Stearic Acid | 3 | 3 | 3 | 3 | 1 |
| Zinc Oxide | 5 | 6 | 5 | 5 | 5 |
| Pine Tar | 5 | 2 | 2 | 2 | |
| Halloysitic Clay | | 60 | | | |
| Black obtained from incomplete combustion of natural gas | 46 | | | | |
| Light magnesium carbonate | | | | 46 | |
| Colloidal china clay | | | 60 | | |

VULCANIZING TEMPERATURES, DURATION AND TEST RESULTS

| | | | | | |
|---|---|---|---|---|---|
| Vulcanization temperature degrees | 138 | 143 | 143 | 143 | 143 |
| Vulcanization duration (corresponding to the tensile stress optimum) variable according to fillers and accelerators. | | | | | |
| Shore Hardness | 65 | 60 | 62 | 58 | 40 |
| Ultimate tensile stress in lbs/sq. in. | 4,338 | 4,466 | 3,385 | 3,271 | 3,058 |
| Modulus with 300% elongation in lbs./sq. in. | 1,323 | 1,294 | 1,152 | 1,252 | 313 |
| Breaking elongation in percent | 620 | 550 | 600 | 525 | 750 |

It is to be understood that the invention in its broader aspects is not limited to the use of any particular proportion of the cryptocrystalline clay filler. The proportion may be varied similarly as in the case of carbon black and other reinforcing and filler materials over a wide range depending upon the properties desired in the vulcanized product. When used as the sole or principal filler component the proportion may vary from 10 to 250% based on the rubber content and the properties desired in the vulcanized product such as elasticity, hardness, tensile strength, breaking elongation and abrasion. By way of example, when the product is intended for use in vehicle tires the clay proportion will ordinarily be around 40%. When shoe soles are involved the clay proportion may be between 120 and 150%, and when shoe heels are being made the clay proportion may be between 180 and 200%, in all cases based on the rubber content of the batch. It will also be understood that the cryptocrystalline clay may be used either alone or in association with other reinforcing agents or fillers since it contributes its reinforcing effect, to the extent it is present in the rubber mix, without regard to the presence of other reinforcing agents.

As previously stated, the microkaolinite used in the tests hereinbefore described as well as the halloysitic clay used in such tests were both obtained from the Provins basin in France. Both of these clays are characterized by a microcrystalline structure and a very uniform particle size. Similar deposits of microkaolinites and halloysites, as well as allophanes and attapulgites, are found in various parts of the world. It will be understood that the term "microkaolinite" is used to distinguish the extremely fine crystalline kaolinic clays from ordinary kaolin where the average particle size is much higher and usually within the range 500–2000 millimicrons.

The cryptocrystalline clays used as fillers may or may not be preliminarily subjected to purifying, corrective or selective treatments depending on their particular nature and the particular effect which it is desired to obtain.

The term "cryptocrystalline clays" as used herein is intended to include only clays that have a definite microcrystalline structure as distinguished from clays that are essentially amorphous.

I claim:

1. A rubber mix containing, in addition to the rubber and as a reinforcing filler, a chemically unmodified cryptocrystalline clay selected from the group consisting of halloysite, microkaolinite, allophane and attapulgite whereof the mean particle diameter is less than about 200 millimicrons and no substantial proportion of particles have a diameter equal to or greater than 500 millimicrons.

2. A rubber mix containing, in addition to rubber and as a reinforcing filler, a chemically unmodified halloysitic clay.

3. A rubber mix containing, in addition to the rubber and as a reinforcing filler, a chemically unmodified microkaolinite whereof the mean particle size is less than about 200 millimicrons and no substantial proportion of particles have a diameter equal to or greater than 500 millimicrons.

4. A rubber mix containing, in addition to the rubber and as a reinforcing filler, a chemically unmodified allophane type clay whereof the mean particle diameter is less than 200 millimicrons and no substantial proportion of the particles have a diameter equal to or greater than 500 millimicrons.

5. A vulcanizable rubber mix characterized by ability to acquire increased strength characteristics when vulcanized and containing as a reinforcing filler a chemically unmodified cryptocrystalline clay selected from the group consisting of halloysite, microkaolinite, allophane and attapulgite whereof the mean particle diameter is less than about 200 millimicrons and no substantial proportion of particles have a diameter equal to or greater than 500 millimicrons, said clay being present in an amount equal to between 10 and 250% of the rubber content by weight.

6. A vulcanizable rubber mix characterized by ability to acquire increased strength characteristics when vulcanized and containing as a reinforcing filler a chemically unmodified halloysitic clay in an amount equal to between 10 and 250% of the rubber content by weight.

7. A vulcanizable rubber mix characterized by ability to acquire increased strength characteristics when vulcanized and containing as a reinforcing filler a chemically unmodified microkaolinite clay whereof the mean particle diameter is less than about 200 millimicrons and no substantial proportion of particles have a diameter equal to or greater than 500 millimicrons, said clay being present in an amount equal to between 10 and 250% of the rubber content by weight.

8. A vulcanizable rubber mix characterized by ability to acquire increased strength characteristics when vulcanized and containing as a reinforcing filler a chemically unmodified allophane clay in an amount equal to between 10 and 250% of the rubber content by weight and whereof the mean particle diameter is less than about 200 millimicrons and no substantial proportion of the particles have a diameter equal to or greater than 500 millimicrons.

9. A vulcanizable rubber mix characterized by ability to acquire increased strength characteristics when vulcanized and containing as a reinforcing filler a chemically unmodified cryptocrystalline clay selected from the group consisting of halloysite, microkaolinite, allophane and attapulgite and whereof the mean particle diameter is less than about 200 millimicrons and no substantial proportion of particles have a diameter equal to or greater than 500 millimicrons, said clay being present in an amount equal to between 25 and 125% of the rubber content by weight.

10. A vulcanizable rubber mix characterized by ability to acquire increased strength characteristics when vulcanized and containing as a reinforcing filler a chemically unmodified halloysitic clay in an amount equal to about 20 to 50% of the rubber content by weight.

11. A vulcanizable rubber mix characterized by ability to acquire increased strength characteristics when vulcanized and containing as a reinforcing filler a chemically unmodified halloysitic clay in an amount equal to about 60 to 120% of the rubber content by weight.

12. As an article of manufacture, a vulcanized rubber containing as a reinforcing filler a chemically unmodified cryptocrystalline clay selected from the group consisting of halloysite, microkaolinite, allophane and attapulgite and whereof the mean particle diameter is less than about 200 millimicrons and no substantial proportion of particles have a diameter equal to or greater than 500 millimicrons.

13. As an article of manufacture, a vulcanized rubber containing as a reinforcing filler a chemically unmodified halloysitic clay.

14. As an article of manufacture, a vulcanized rubber containing as a reinforcing filler a chemically unmodified allophane clay whereof the mean particle diameter is less than about 200 millimicrons and no substantial proportion of the particles have a diameter equal to or greater than 500 millimicrons.

15. As an article of manufacture, a vulcanized rubber containing a chemically unmodified halloysitic clay in an amount between about 25 and 125% of the rubber content by weight.

16. As an article of manufacture, a vulcanized rubber containing a chemically unmodified halloysitic clay in an amount equal to about 20 to 50% of the rubber content by weight.

17. As an article of manufacture, a vulcanized rubber containing a chemically unmodified halloysitic clay in an amount equal to about 60 to 120% of the rubber content by weight.

18. As an article of manufacture, a vulcanized rubber containing a chemically unmodified halloysitic clay in an amount equal to about 60% of the rubber content by weight.

19. As an article of manufacture, a vulcanized rubber containing a chemically unmodified microkaolinite clay whereof the mean particle diameter is less than about 200 millimicrons and no substantial proportion of particles have a diameter equal to or greater than 500 millimicrons, said clay being present in an amount between about 25 and 125% of the rubber content by weight.

20. As an article of manufacture, a vulcanized rubber containing a chemically unmodified microkaolinite clay whereof the mean particle diameter is less than about 200 millimicrons and no substantial proportion of particles have a diameter equal to or greater than 500 millimicrons, said clay being present in an amount of between 60 and 120% of the rubber content by weight.

References Cited in the file of this patent

UNITED STATES PATENTS

| Number | Name | Date |
|---|---|---|
| 91,216 | Dickenson | June 4, 1869 |
| 2,261,260 | Kraus | Nov. 4, 1941 |
| 2,531,396 | Carter et al. | Nov. 28, 1950 |

FOREIGN PATENTS

| Number | Country | Date |
|---|---|---|
| 62,060 | Netherlands | Nov. 15, 1948 |

OTHER REFERENCES

India Rubber World, vol. 118 of 1948, pp. 793–795.